United States Patent
Sakoh et al.

(10) Patent No.: US 10,196,483 B2
(45) Date of Patent: Feb. 5, 2019

(54) FLUOROPOLYETHER-CONTAINING POLYMER-MODIFIED SILANE, SURFACE TREATING AGENT, AND ARTICLE

(71) Applicant: Shin-Etsu Chemical Co., Ltd., Tokyo (JP)

(72) Inventors: Ryusuke Sakoh, Annaka (JP); Takashi Matsuda, Annaka (JP); Yuji Yamane, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 91 days.

(21) Appl. No.: 15/141,991

(22) Filed: Apr. 29, 2016

(65) Prior Publication Data

US 2016/0319071 A1 Nov. 3, 2016

(30) Foreign Application Priority Data

May 1, 2015 (JP) ................. 2015-093830

(51) Int. Cl.
| | | |
|---|---|---|
| *C08G 65/336* | (2006.01) | |
| *C08G 65/00* | (2006.01) | |
| *C09D 171/02* | (2006.01) | |

(52) U.S. Cl.
CPC ......... *C08G 65/336* (2013.01); *C08G 65/007* (2013.01); *C09D 171/02* (2013.01); *C08G 2650/48* (2013.01)

(58) Field of Classification Search
CPC .............................. C08G 65/226; C08G 65/336
See application file for complete search history.

(56) References Cited

U.S. PATENT DOCUMENTS

| | | | | |
|---|---|---|---|---|
| 5,262,506 A | * | 11/1993 | Okawa ................. | C07F 7/0854 528/26 |
| 6,133,394 A | * | 10/2000 | Furukawa ............. | C07F 7/0852 528/15 |
| 6,136,521 A | * | 10/2000 | Hikosaka ............ | C08G 64/085 428/412 |
| 6,140,450 A | * | 10/2000 | Ishikawa ............. | C08G 77/18 524/269 |
| 8,211,544 B2 | | 7/2012 | Itami et al. | |
| 8,664,421 B2 | | 3/2014 | Itami et al. | |
| 8,900,711 B2 | | 12/2014 | Yamane et al. | |
| 2004/0137241 A1 | * | 7/2004 | Lin .................... | C08G 77/04 428/447 |
| 2013/0136928 A1 | | 5/2013 | Yamane et al. | |
| 2013/0303689 A1 | | 11/2013 | Sato et al. | |

FOREIGN PATENT DOCUMENTS

| | | | |
|---|---|---|---|
| JP | 09-227580 A | * | 9/1997 |
| JP | 2008-534696 | | 8/2008 |
| JP | 2008-537557 | | 9/2008 |
| JP | 2012-72272 | | 4/2012 |
| JP | 2012-102153 A | * | 5/2012 |
| JP | 2012-157856 | | 8/2012 |
| JP | 2013-136833 | | 7/2013 |
| WO | WO 2016/101185 | * | 6/2016 |

OTHER PUBLICATIONS

Abstract for the article entitled "Dehydrocondensation and Hydrosilylation Reactions of Methylhydride Siloxane with Allyl Alcohol" authored by Mukbaniani et al. and published in Russian Polymer News (2001) 6(4), 18-24.*

Subject matter taken from a posted document at the url: http://www.vanderbilt.edu/AnS/Chemistry/Rizzo/chem223/protect.pdf. which cites to a reference entitled "Protective Groups in Organic Synthesis (2nd edition)" published by Wiley and Sons in 1991.*

* cited by examiner

*Primary Examiner* — Marc S Zimmer
(74) *Attorney, Agent, or Firm* — Oblon, McClelland, Maier & Neustadt, L.L.P.

(57) ABSTRACT

A fluoropolyether-containing polymer-modified silane having formula (1) is provided wherein Rf is a fluorooxyalkyl or fluorooxyalkylene-containing polymer residue, Y is a divalent to hexavalent hydrocarbon group, R and R' are $C_1$-$C_4$ alkyl or phenyl, X and X' are hydroxyl or a hydrolyzable group, n is an integer of 1 to 3, a is an integer of 0 to 3, m is an integer of 1 to 5, and α is 1 or 2. A surface treating agent comprising the silane has storage stability and cures into a water/oil repellent layer having weatherability.

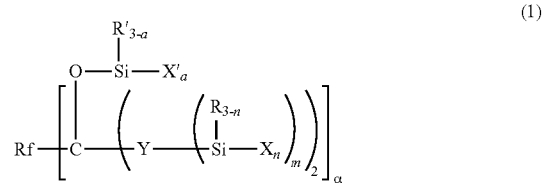

(1)

6 Claims, No Drawings

FLUOROPOLYETHER-CONTAINING POLYMER-MODIFIED SILANE, SURFACE TREATING AGENT, AND ARTICLE

CROSS-REFERENCE TO RELATED APPLICATION

This non-provisional application claims priority under 35 U.S.C. § 119(a) on Patent Application No. 2015-093830 filed in Japan on May 1, 2015, the entire contents of which are hereby incorporated by reference.

TECHNICAL FIELD

This invention relates to a silane modified with a fluoropolyether-containing polymer, and more particularly, to a fluoropolyether-containing polymer-modified silane having storage stability and forming a coating with weatherability, a surface treating agent comprising the modified silane, and an article treated with the surface treating agent.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an increasing need for technology to attain fingerprint proofness or easy stain removal on a display surface for better appearance or visibility. It is thus desired to have a material capable of meeting these requirements. In particular, for touch panel displays which are readily stained with fingerprints, it is desirable to form a water/oil repellent layer on their surface. Prior art water/oil repellent layers have high water/oil repellency and easy stain wipe-off, but suffer from the problem that the antifouling performance deteriorates during service.

Generally, fluoropolyether-containing compounds exhibit, by virtue of their extremely low surface free energy, water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond surfaces of glass or fabric substrates to organic compounds. They are widely used as surface coating agents for numerous substrates. The silane coupling agent contains an organic functional group and a reactive silyl group (typically hydrolyzable silyl such as alkoxysilyl) in the molecule. In the presence of airborne moisture or the like, the hydrolyzable silyl groups undergo self-condensation reaction to form a coating. As the hydrolyzable silyl groups form chemical and physical bonds with the surface of glass or metal, the coating becomes a tough coating having durability.

Patent Documents 1 to 5 disclose a composition predominantly comprising a fluoropolyether-containing polymer-modified silane which is obtained by introducing a hydrolyzable silyl group into a fluoropolyether-containing compound, the composition being tightly adherent to the substrate surface and capable of forming a coating with water/oil repellency, chemical resistance, lubricity, parting, antifouling and other properties.

Lenses and antireflective coatings, when treated with the fluoropolyether-containing polymer-modified silane, are improved in lubricity and parting property, but lack abrasion resistance and weather resistance.

CITATION LIST

Patent Document 1: JP-A 2008-534696 (U.S. Pat. No. 8,211,544)
Patent Document 2: JP-A 2008-537557 (U.S. Pat. No. 8,664,421)
Patent Document 3: JP-A 2012-072272 (U.S. Pat. No. 8,900,711)
Patent Document 4: JP-A 2012-157856 (US 2013303689)
Patent Document 5: JP-A 2013-136833 (US 2013136928)

DISCLOSURE OF INVENTION

The inventors proposed in Japanese Patent Application No. 2014-250460 a fluoropolyether-containing polymer-modified silane of the following formula as a fluoropolyether-containing compound having excellent abrasion resistance.

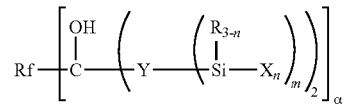

Herein Rf is a monovalent fluorooxyalkyl or divalent fluorooxyalkylene-containing polymer residue, Y is a divalent to hexavalent hydrocarbon group which may contain a siloxane bond or a silylene group, R is independently $C_1$-$C_4$ alkyl or phenyl, X is independently a hydrolyzable group, n is an integer of 1 to 3, m is an integer of 1 to 5, and α is 1 or 2. A surface treating agent comprising the modified silane and/or partial hydrolytic condensate thereof forms a coating with excellent water/oil repellency and abrasion resistance. The modified silane is curable at low temperature, but sometimes lacks storage stability due to high reactivity.

An object of the invention is to provide a fluoropolyether-containing polymer-modified silane which has storage stability and cures into a water/oil repellent layer having weatherability; a surface treating agent comprising the silane; and an article treated with the surface treating agent.

The inventors have found that a fluoropolyether-containing polymer-modified silane which is analogous to the fluoropolyether-containing polymer-modified silane mentioned above, but has a silyl-protected hydroxyl group has storage stability and forms a water/oil repellent layer exhibiting weatherability.

In one aspect, the invention provides a fluoropolyether-containing polymer-modified silane having the general formula (1).

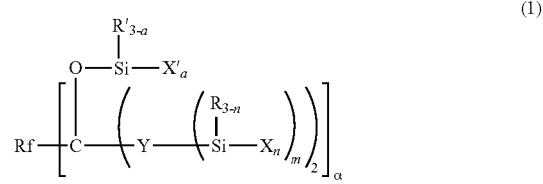

Herein Rf is a monovalent fluorooxyalkyl or divalent fluorooxyalkylene-containing polymer residue, Y is a divalent to hexavalent hydrocarbon group which may contain a siloxane bond or a silylene group, R and R' are each independently a $C_1$-$C_4$ alkyl group or phenyl group, X and X' are each independently a hydroxyl or hydrolyzable group, n is an integer of 1 to 3, a is an integer of 0 to 3, m is an integer of 1 to 5, and α is 1 or 2.

In a preferred embodiment, α is 1, and Rf is a group having the general formula (2).

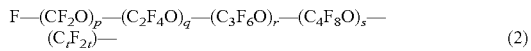
(2)

Herein p, q, r and s are each independently an integer of 0 to 200, the sum p+q+r+s is 3 to 200, t is an integer of 1 to 3, each repeating unit may be linear or branched, and individual repeating units may be randomly arranged.

In a preferred embodiment, Y is selected from among a $C_3$-$C_{10}$ alkylene group, a $C_8$-$C_{16}$ alkylene group containing phenylene, a divalent group having $C_2$-$C_{10}$ alkylene groups bonded via a silalkylene or silarylene structure, and a divalent to tetravalent group having $C_2$-$C_{10}$ alkylene groups bonded to a divalent to tetravalent, linear organopolysiloxane residue of 2 to 10 silicon atoms or branched or cyclic organopolysiloxane residue of 3 to 10 silicon atoms.

In a preferred embodiment, X and X' each are selected from among hydroxyl, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

In a preferred embodiment, the fluoropolyether-containing polymer-modified silane having formula (1) is selected from compounds having the following formulae.

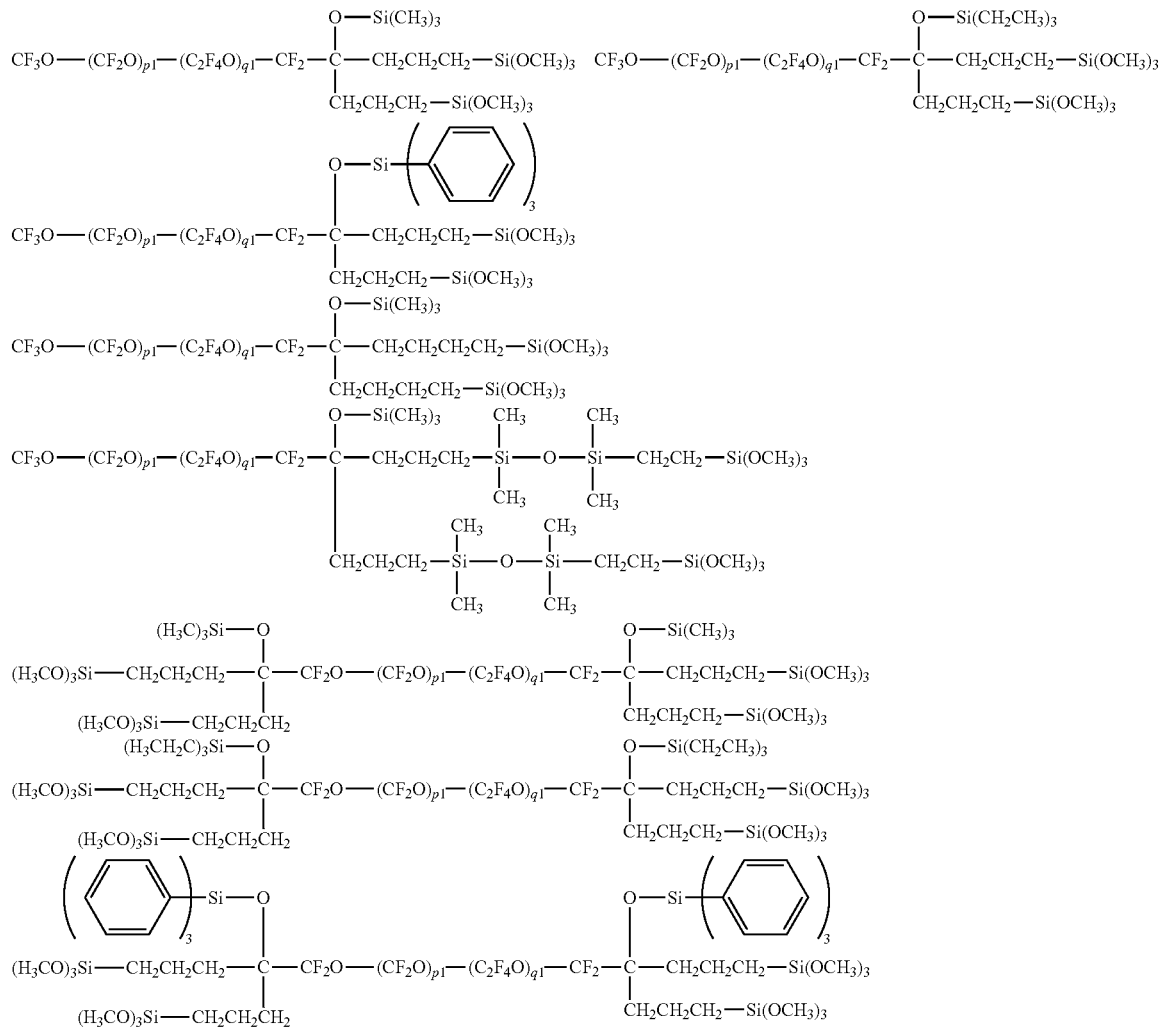

In another preferred embodiment, α is 2, and Rf is a group having the general formula (3).

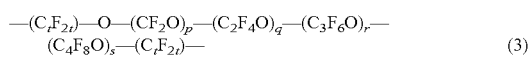
(3)

Herein p, q, r and s are each independently an integer of 0 to 200, the sum p+q+r+s is 3 to 200, t is an integer of 1 to 3, each repeating unit may be linear or branched, and individual repeating units may be randomly arranged.

Herein p1 is an integer of 5 to 100, q1 is an integer of 5 to 100, and the sum p1+q1 is an integer of 10 to 105.

In another aspect, the invention provides a surface treating agent comprising the fluoropolyether-containing polymer-modified silane defined above.

Also contemplated herein is an article which is surface treated with the surface treating agent.

Advantageous Effects of Invention

The surface treating agent comprising a fluoropolyether-containing polymer-modified silane having a carbon-bonded hydroxyl group capped with silyl according to the invention remains stable during storage and forms a water/oil repellent layer exhibiting excellent weatherability.

DESCRIPTION OF PREFERRED EMBODIMENTS

The singular forms "a," "an" and "the" include plural referents unless the context clearly dictates otherwise. The notation (Cn-Cm) means a group containing from n to m carbon atoms per group.

The fluoropolyether-containing polymer-modified silane of the invention has the general formula (1).

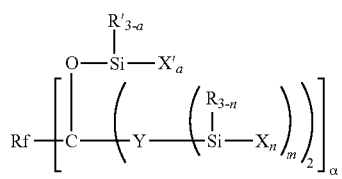
(1)

Herein Rf is a monovalent fluorooxyalkyl or divalent fluorooxyalkylene-containing polymer residue, Y is a divalent to hexavalent hydrocarbon group which may contain a siloxane bond or a silylene group, R and R' are each independently a $C_1$-$C_4$ alkyl group or phenyl group, X and X' are each independently a hydroxyl or hydrolyzable group, n is an integer of 1 to 3, a is an integer of 0 to 3, m is an integer of 1 to 5, and α is 1 or 2.

The fluoropolyether-containing polymer-modified silane of the invention has a structure that the monovalent fluorooxyalkyl or divalent fluorooxyalkylene-containing polymer residue (Rf) is linked to the hydrolyzable silyl group such as alkoxysilyl or hydroxyl-containing silyl group (—Si(R)$_{3-n}$(X)$_n$) via the hydrocarbon chain (Y). Further, the carbon-bonded hydroxyl in the polymer is protected with the silyl group (—Si(R')$_{3-a}$(X')$_a$). This structure ensures that the polymer-modified silane has storage stability and forms a water/oil repellent layer having excellent weather resistance, and does not adversely affect the abrasion resistance of the water/oil repellent layer.

In one preferred embodiment wherein α is 1, Rf is a monovalent fluorooxyalkyl group having the general formula (2):

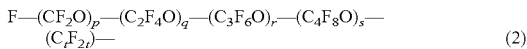
(2)

wherein p, q, r and s are each independently an integer of 0 to 200, the sum p+q+r+s is 3 to 200, t is an integer of 1 to 3, each repeating unit may be linear or branched, and individual repeating units may be randomly arranged.

In another preferred embodiment wherein α is 2, Rf is a divalent fluorooxyalkylene group having the general formula (3):

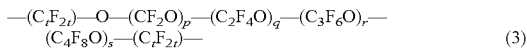
(3)

wherein p, q, r and s are each independently an integer of 0 to 200, the sum p+q+r+s is 3 to 200, t is an integer of 1 to 3, each repeating unit may be linear or branched, and individual repeating units may be randomly arranged.

In formulae (2) and (3), p, q, r and s are each independently an integer of 0 to 200, preferably p is an integer of 5 to 100, q is an integer of 5 to 100, r is an integer of 0 to 100, and s is an integer of 0 to 100. The sum p+q+r+s is 3 to 200, preferably 10 to 100. Each repeating unit may be linear or branched, and individual repeating units may be randomly arranged. More preferably p+q is an integer of 10 to 105, even more preferably 15 to 60, and r=s=0. If p+q+r+s is less than or equal to the upper limit, adhesion and cure are satisfactory. If p+q+r+s is greater than or equal to the lower limit, the fluoropolyether group fully exerts its characteristics. The subscript t is an integer of 1 to 3, preferably 1 or 2, and $C_tF_{2t}$ may be either linear or branched.

Examples of Rf are shown below.

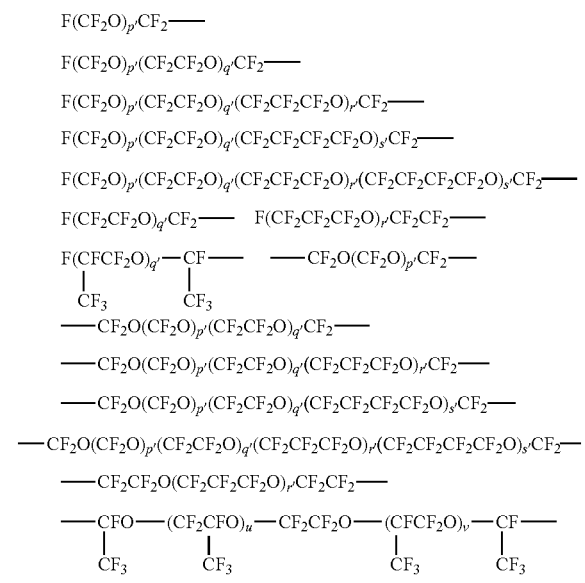

Herein p', q', r' and s' each are an integer of at least 1 and their upper limits are the same as defined for p, q, r and s. Each of u and v is a number of 1 to 24, satisfying u+v=r, and individual repeating units may be randomly arranged.

In formula (1), Y is a hydrocarbon group which is di- to hexavalent, preferably di- to tetravalent, and most preferably divalent, and which may contain a siloxane bond or a silylene group. Due to elimination of a linker with low bond energy (typically ether bond) from the molecule, a coating having improved weatherability and abrasion resistance can be formed.

Specifically, Y is selected from the following: $C_3$-$C_{10}$ alkylene groups such as propylene (trimethylene or methylethylene), butylene (tetramethylene or methylpropylene), and hexamethylene; alkylene groups containing $C_6$-$C_8$ arylene, typically phenylene, such as $C_8$-$C_{16}$ alkylene-arylene groups; a divalent group having $C_2$-$C_{10}$ alkylene groups bonded via a silalkylene or silarylene structure; and a di- to hexavalent group having alkylene groups bonded to valence bonds of a di- to hexavalent, linear, branched or cyclic organopolysiloxane residue of 2 to 10 silicon atoms, preferably 2 to 5 silicon atoms. Preferably Y is a $C_3$-$C_{10}$ alkylene group, a $C_8$-$C_{16}$ alkylene group containing phenylene, a divalent group having $C_2$-$C_{10}$ alkylene groups bonded via a silalkylene or silarylene structure, or a di- to tetravalent group having $C_2$-$C_{10}$ alkylene groups bonded to valence bonds of a di- to tetravalent, linear organopolysiloxane residue of 2 to 10 silicon atoms or branched or cyclic organopolysiloxane residue of 3 to 10 silicon atoms, and more preferably $C_3$-$C_6$ alkylene group.

The silalkylene or silarylene structure is exemplified by the following structure.

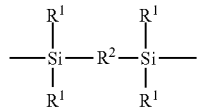

Herein $R^1$ which may be the same or different is a $C_1$-$C_4$ alkyl group such as methyl, ethyl, propyl or butyl, or $C_6$-$C_{10}$ aryl group such as phenyl. $R^2$ is a $C_1$-$C_4$ alkylene group such as methylene, ethylene, or propylene (trimethylene or methylethylene), or $C_6$-$C_{10}$ arylene group such as phenylene.

Examples of the di- to hexavalent, linear, branched or cyclic organopolysiloxane residue of 2 to 10 silicon atoms, preferably 2 to 5 silicon atoms are shown below.

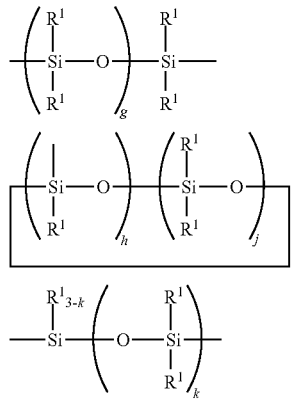

Herein $R^1$ is as defined above, g is an integer of 1 to 9, preferably 1 to 4, h is an integer of 2 to 6, preferably 2 to 4, j is an integer of 0 to 8, preferably 0 or 1, the sum h+j is an integer of 3 to 10, preferably 3 to 5, and k is an integer of 1 to 3, preferably 2 or 3.

Examples of Y are shown below.

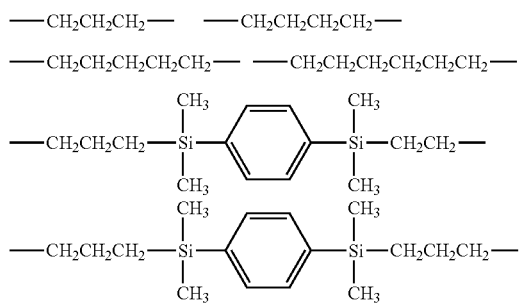

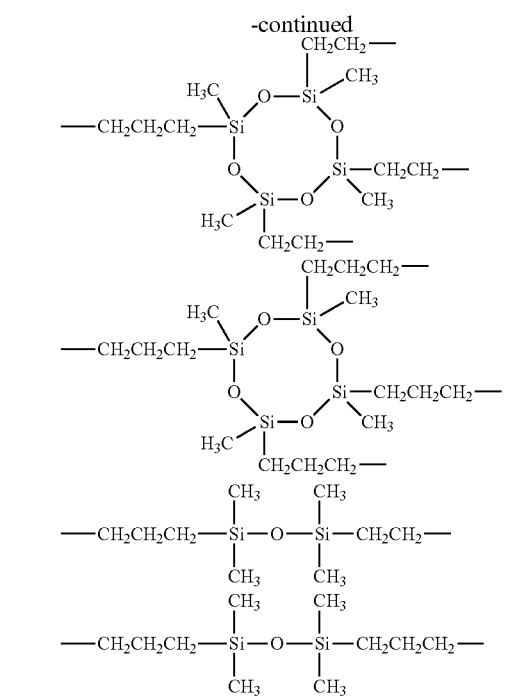

In formula (1), X is each independently a hydroxyl or hydrolyzable group. Examples of X include hydroxyl, $C_1$-$C_{10}$ alkoxy groups such as methoxy, ethoxy, propoxy, isopropoxy and butoxy, $C_2$-$C_{10}$ alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, and halogen groups such as chloro, bromo and iodo. Inter alia, methoxy, ethoxy, isopropenoxy and chloro are preferred.

In formula (1), R is a $C_1$-$C_4$ alkyl group such as methyl, ethyl, propyl or butyl, or a phenyl group, with methyl being preferred. The subscript n is an integer of 1 to 3, preferably 2 or 3. It is most preferred from the standpoints of reactivity and adhesion to substrates that n be 3. The subscript m is an integer of 1 to 5. If m is less than 1, adhesion to substrates is poor. If m is more than 5, an excessively high terminal alkoxy number adversely affects the desired performance. Preferably m is 1, 2 or 3, and most preferably 1.

In formula (1), X' is each independently a hydroxyl or hydrolyzable group. Examples of X' include hydroxyl, $C_1$-$C_{10}$ alkoxy groups such as methoxy, ethoxy, propoxy, isopropoxy and butoxy, $C_2$-$C_{10}$ alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, and halogen groups such as chloro, bromo and iodo. Inter alia, methoxy, ethoxy, isopropenoxy and chloro are preferred.

In formula (1), R' is a $C_1$-$C_4$ alkyl group such as methyl, ethyl, propyl or butyl, or a phenyl group, with methyl and ethyl being preferred. The subscript a is an integer of 0 to 3, preferably 0 or 1. It is most preferred from the standpoint of storage stability that a be 0.

Examples of the fluoropolyether-containing polymer-modified silane of formula (1) are shown below. In each formula, the repetition number of repeating units in the form of fluorooxyalkyl or fluorooxyalkylene groups, also referred to as degree of polymerization, may be an arbitrary number meeting formula (2) or (3) representative of Rf.

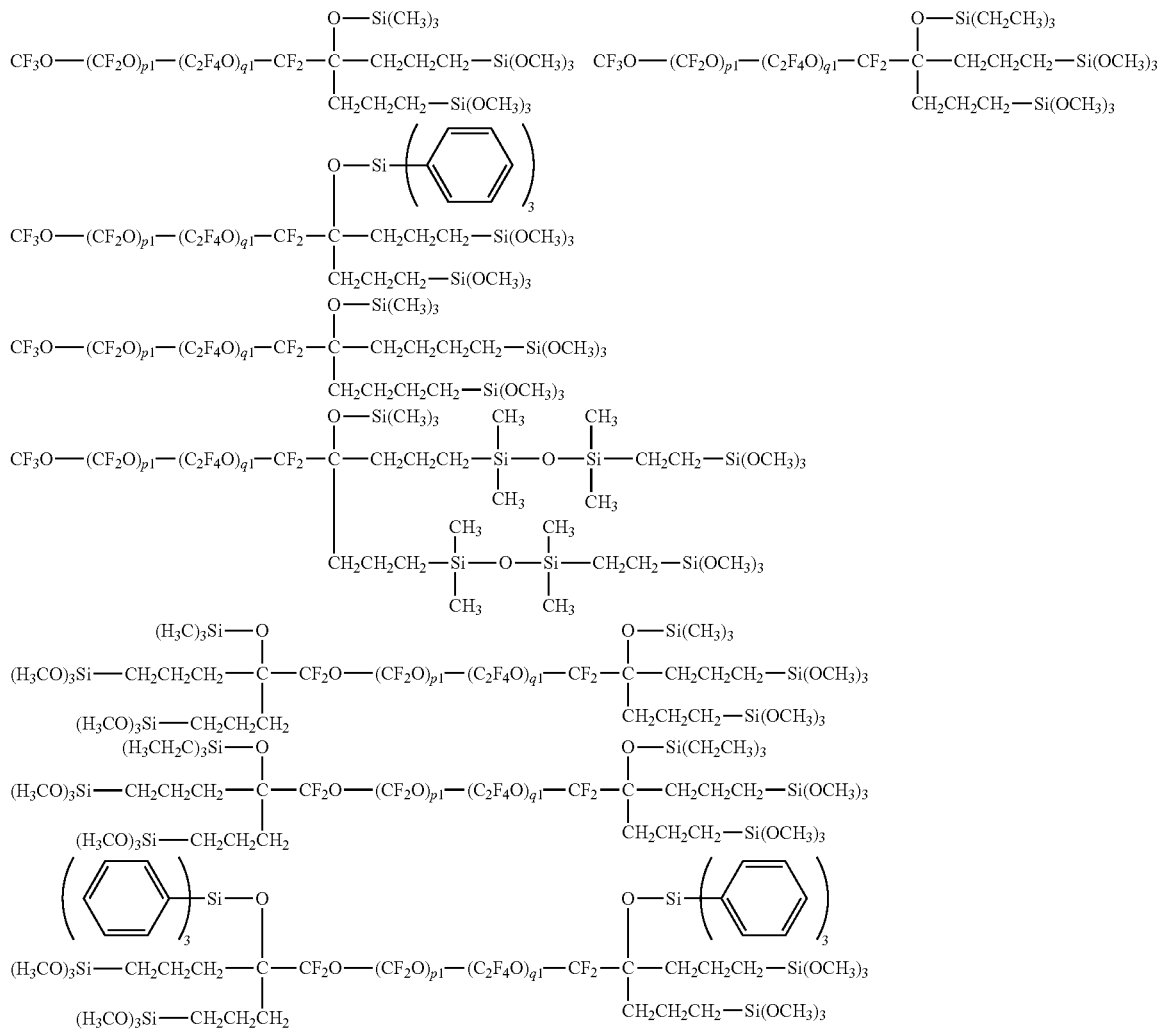

Herein p1 is an integer of 5 to 100, q1 is an integer of 5 to 100, and the sum p1+q1 is an integer of 10 to 105.

The fluoropolyether-containing polymer-modified silane of formula (1) wherein α=1 may be prepared, for example, by the following methods. In one exemplary method, a fluorooxyalkyl-containing polymer having two olefin sites at one end of the molecular chain is dissolved in a solvent, typically fluorochemical solvent such as 1,3-bis(trifluoromethyl)benzene. To the solution, an organosilicon compound having a SiH group and a hydrolyzable terminal group in the molecule such as trimethoxysilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 20 to 36 hours, and more preferably about 24 hours.

Another method may be employed for preparing the fluoropolyether-containing polymer-modified silane of formula (1) wherein α=1. A fluorooxyalkyl-containing polymer having two olefin sites at one end of the molecular chain is dissolved in a solvent, typically fluorochemical solvent such as 1,3-bis(trifluoromethyl)benzene. To the solution, an organosilicon compound having a SiH group and a hydrolyzable terminal group in the molecule such as trichlorosilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 20 to 36 hours, and more preferably about 24 hours. Finally, the substituent on the silyl group is converted to a methoxy group, for example.

Instead of the organosilicon compound having a SiH group and a hydrolyzable terminal group in the molecule, an SiH-containing organosilicon compound free of a hydrolyzable terminal group may also be used. In this case, an organosilicon compound having at least two SiH groups, but not hydrolyzable terminal group is used. Once the organosilicon compound having at least two SiH groups, but not hydrolyzable terminal group is reacted with a fluorooxyalkyl-containing polymer having two olefin sites at one end of the molecular chain like the above method, a mixture of the resulting polymer product having terminal SiH groups and an organosilicon compound having an olefin site and a hydrolyzable terminal group in the molecule such as allyltrimethoxysilane is aged, in the presence of a hydrosilylation catalyst such as a toluene solution of chloroplatinic acid/vinylsiloxane complex, at a temperature of 40 to 120° C., preferably 60 to 100° C., and more preferably about 80° C. for 1 to 72 hours, preferably 20 to 36 hours, and more preferably about 24 hours.

The fluorooxyalkyl-containing polymer having two olefin sites at one end of the molecular chain is typically a fluorooxyalkyl-containing polymer of the general formula (4).

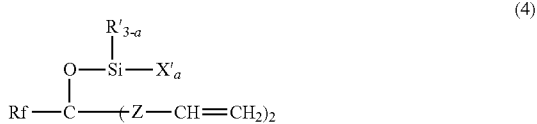
(4)

Herein Rf, R', X' and a are as defined above. Z is a divalent hydrocarbon group.

In formula (4), Z is a divalent hydrocarbon group having 1 to 8 carbon atoms, preferably 1 to 4 carbon atoms. Suitable examples include $C_1$-$C_8$ alkylene groups such as methylene, ethylene, propylene (trimethylene or methylethylene), butylene (tetramethylene or methylpropylene), hexamethylene and octamethylene and alkylene groups containing $C_6$-$C_8$ arylene, typically phenylene, such as $C_7$-$C_8$ alkylene-arylene groups. Preferably Z is a $C_1$-$C_4$ linear alkylene group.

Preferred examples of the fluorooxyalkyl-containing polymer of formula (4) are shown below. In each formula, the repetition number of repeating units in the form of fluorooxyalkyl groups, also referred to as degree of polymerization, may be an arbitrary number meeting formula (2) representative of Rf.

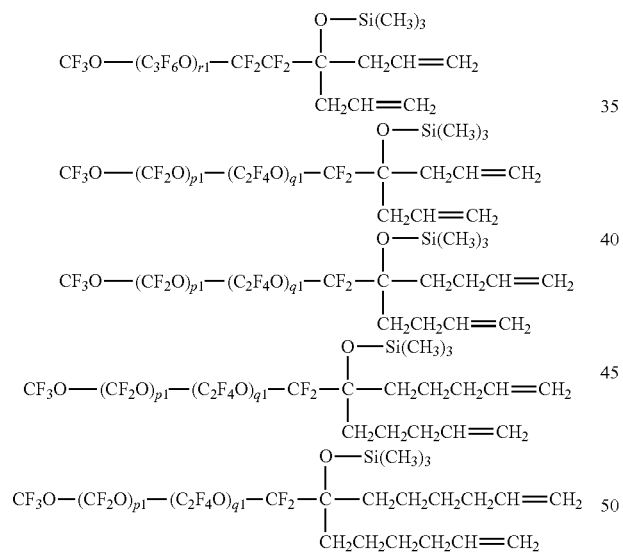

Herein r1 is an integer of 1 to 100, p1, q1 and p1+q1 are as defined above.

The fluorooxyalkyl-containing polymer of formula (4) may be prepared, for example, by the following method. A fluorooxyalkyl-containing polymer having a hydroxyl group at one end of the molecular chain is mixed with a silylating agent and optionally a solvent, and aged in the presence of a base at a temperature of 0 to 80° C., preferably 40 to 60° C., and more preferably about 50° C. for 1 to 24 hours, preferably 2 to 10 hours, and more preferably about 3 hours.

Another method may be employed for preparing the fluorooxyalkyl-containing polymer of formula (4). A fluorooxyalkyl-containing polymer having a hydroxyl group at one end of the molecular chain is mixed with a hydrosilane and a solvent in the presence of a dehydrogenation catalyst at 0 to 60° C., preferably 15 to 35° C., and more preferably about 25° C. for 10 minutes to 24 hours, preferably 30 minutes to 2 hours, and more preferably about 1 hour for dehydrogenation reaction.

Examples of the fluorooxyalkyl-containing polymer having a hydroxyl group at one end of the molecular chain used for preparation of the fluorooxyalkyl-containing polymer of formula (4) are given below.

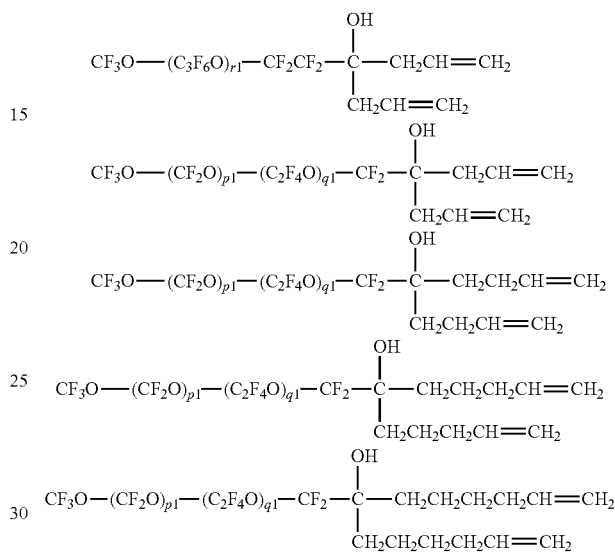

Herein r1, p1, q1, and p1+q1 are as defined above.

The fluorooxyalkyl-containing polymer having a hydroxyl group at one end of the molecular chain may be prepared, for example, by the following method. A perfluorooxyalkyl-containing polymer having an acid fluoride group (—C(=O)—F) at one end of the molecular chain is mixed with a Grignard reagent as a nucleophilic reagent and a solvent such as 1,3-bis(trifluoromethyl)benzene or tetrahydrofuran, and aged at a temperature of 0 to 80° C., preferably 50 to 70° C., and more preferably about 60° C. for 1 to 6 hours, preferably 3 to 5 hours, and more preferably about 4 hours.

Besides the acid fluoride, the perfluorooxyalkyl-containing polymer may have another group at one end of the molecular chain, such as acid halide, acid anhydride, ester, carboxylic acid or amide. Examples of the perfluorooxyalkyl-containing polymer having such a group at one end of the molecular chain are shown below.

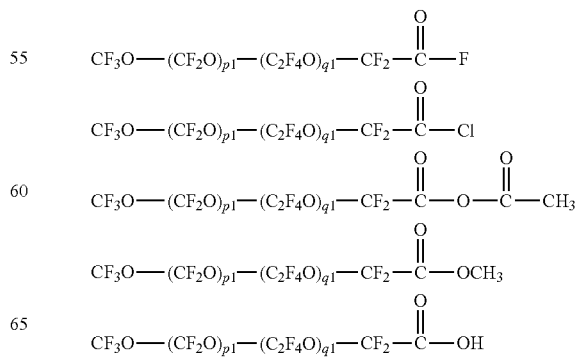

-continued

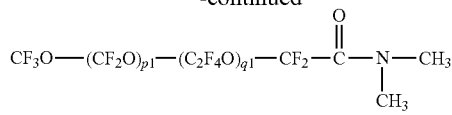

Herein p1, q1, and p1+q1 are as defined above.

The nucleophilic reagent used in the preparation of a fluorooxyalkyl-containing polymer having a hydroxyl group at one end of the molecular chain may be selected from allylmagnesium halides, 3-butenylmagnesium halides, 4-pentenylmagnesium halides, and 5-hexenylmagnesium halides, for example. Corresponding lithium reagents may also be used. Relative to the perfluorooxyalkyl-containing polymer, the nucleophilic reagent may be used in an amount of 2 to 5 equivalents, preferably 2.5 to 3.5 equivalents, and more preferably about 3 equivalents per equivalent of reactive terminal group of the polymer.

As the solvent used in the preparation of a fluorooxyalkyl-containing polymer having a hydroxyl group at one end of the molecular chain, suitable fluorochemical solvents include 1,3-bis(trifluoromethyl)benzene, trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 100 to 200 parts, and more preferably about 150 parts by weight per 100 parts by weight of the perfluorooxyalkyl-containing polymer.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkyl-containing polymer having a hydroxyl group at one end of the molecular chain.

Typical of the silylating agent used in the preparation of a fluorooxyalkyl-containing polymer of formula (4) are silyl halides and silyl triflates including trimethylsilyl chloride, triethylsilyl chloride, t-butyldimethylsilyl chloride, triisopropylsilyl chloride, triphenylsilyl chloride, trimethylsilyl bromide, trimethylsilyl triflate, triethylsilyl triflate, t-butyldimethylsilyl triflate, and triisopropylsilyl triflate. Where the base is not used, hexamethyldisilazane, trimethylsilyldimethylamine, trimethylsilyldiethylamine or trimethylsilylimidazole may be used. The silylating agent may be used in an amount of 1 to 10 equivalents, preferably 1 to 4 equivalents, and more preferably about 2 equivalents per equivalent of reactive terminal group of the fluorooxyalkyl-containing polymer having a hydroxyl group.

Examples of the base used in the preparation of a fluorooxyalkyl-containing polymer of formula (4) are amines and alkali metal bases. Suitable amines include triethylamine, diisopropylethylamine, pyridine, DBU, and imidazole. Suitable alkali metal bases include sodium hydroxide, potassium hydroxide, sodium hydride, potassium hydride, alkyllithium, potassium t-butoxide, lithium diisopropylamide, lithium bis(trimethylsilyl)amide, sodium bis(trimethylsilyl) amide, and potassium bis(trimethylsilyl)amide. The base may be used in an amount of 1 to 10 equivalents, preferably 1 to 4 equivalents, and more preferably about 2 equivalents per equivalent of reactive terminal group of the fluorooxyalkyl-containing polymer having a hydroxyl group.

As the solvent used in the preparation of a fluorooxyalkyl-containing polymer(4), suitable fluorochemical solvents include fluorinated aromatic hydrocarbon solvents such as 1,3-bis(trifluoromethyl)benzene and trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 50 to 150 parts, and more preferably about 100 parts by weight per 100 parts by weight of the fluorooxyalkyl-containing polymer having a hydroxyl group.

The hydrosilane used in the preparation of a fluorooxyalkyl-containing polymer of formula (4) may be selected from trimethylsilane, triethylsilane, t-butyldimethylsilane, triisopropylsilane, and triphenylsilane. The hydrosilane is preferably used in an amount of 1 to 5 equivalents, more preferably 1.5 to 3 equivalents, and even more preferably about 2 equivalents per equivalent of reactive terminal group of the fluorooxyalkyl-containing polymer having a hydroxyl group.

Examples of the dehydrogenation catalyst used in the preparation of a fluorooxyalkyl-containing polymer of formula (4) are platinum group metal based catalysts such as rhodium, palladium and ruthenium catalysts, and boron catalysts. Suitable platinum group metal based catalysts include tetrakis(triphenylphosphine)palladium and chlorotris(triphenylphosphine)rhodium, and suitable boron catalysts include tris(pentafluorophenyl)borane. The dehydrogenation catalyst is preferably used in an amount of 0.01 to 0.0005 equivalent, more preferably 0.007 to 0.001 equivalent, and even more preferably about 0.005 equivalent per equivalent of reactive terminal group of the fluorooxyalkyl-containing polymer having a hydroxyl group.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkyl-containing polymer of formula (4).

As mentioned previously, the method for the preparation of a fluoropolyether-containing polymer-modified silane having formula (1) wherein α=1 uses a solvent. As the solvent, fluorochemical solvents are preferred and include 1,3-bis(trifluoromethyl)benzene and trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). The solvent may be used in an amount of 10 to 300 parts, preferably 50 to 150 parts, and more preferably about 100 parts by weight per 100 parts by weight of the fluorooxyalkyl-containing polymer having two olefin sites at one end of the molecular chain.

The organosilicon compound having a SiH group and a hydrolyzable terminal group in the molecule used in the preparation of a fluoropolyether-containing polymer-modified silane of formula (1) wherein $\alpha=1$ is preferably selected from compounds having the general formulae (5) to (8).

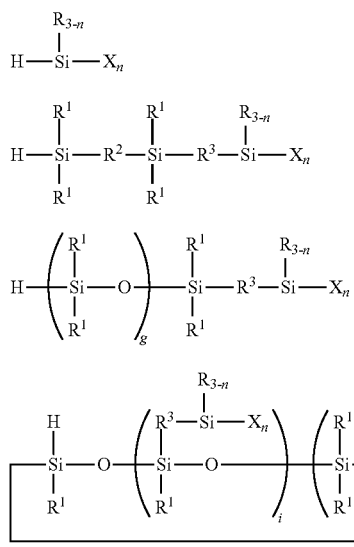

Herein R, X, n, $R^1$, $R^2$, g and j are as defined above, $R^3$ is a $C_2$-$C_8$ divalent hydrocarbon group, i is an integer of 2 to 9, preferably 2 to 4, and the sum i+j is an integer of 2 to 9.

$R^3$ is a $C_2$-$C_8$, preferably $C_2$-$C_3$ divalent hydrocarbon group, examples of which include alkylene groups such as methylene, ethylene, propylene (trimethylene or methylethylene), butylene (tetramethylene or methylpropylene), hexamethylene and octamethylene, arylene groups such as phenylene, and combinations of two or more of the foregoing such as alkylene-arylene groups. Inter alia, ethylene and trimethylene are preferred.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane as well as organosilicon compounds of the following formulae.

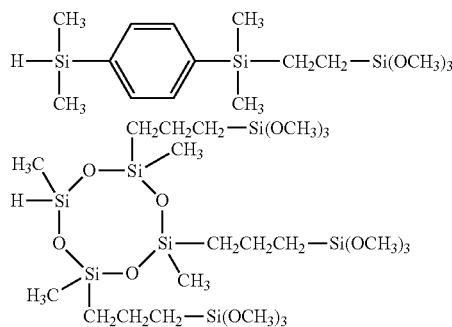

-continued

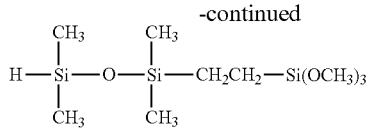

In the reaction of the fluorooxyalkyl-containing polymer having two olefin sites at one end of the molecular chain with the organosilicon compound having a SiH group and a hydrolyzable terminal group in the molecule for preparation of the fluoropolyether-containing polymer-modified silane of formula (1) wherein $\alpha=1$, the organosilicon compound may be used in an amount of 2 to 6 equivalents, preferably 2.2 to 3.5 equivalents, and more preferably about 3 equivalents per equivalent of reactive terminal group of the polymer.

The organosilicon compound having at least two SiH groups, but not hydrolyzable terminal groups in the molecule used in the preparation of a fluoropolyether-containing polymer-modified silane of formula (1) wherein $\alpha=1$ is preferably selected from compounds having the general formulae (9) to (11).

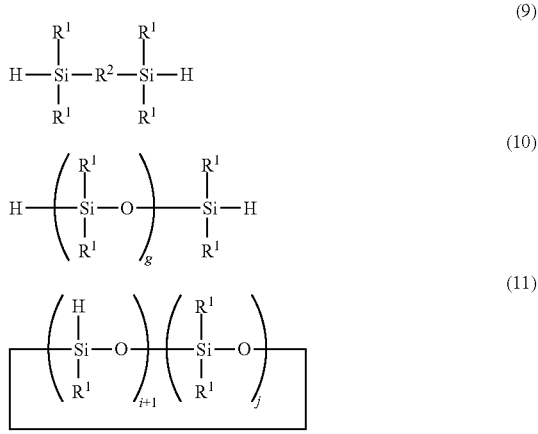

Herein $R^1$, $R^2$, g, j and i are as defined above.

Examples of the organosilicon compound having at least two SiH groups, but not hydrolyzable terminal groups in the molecule are shown below.

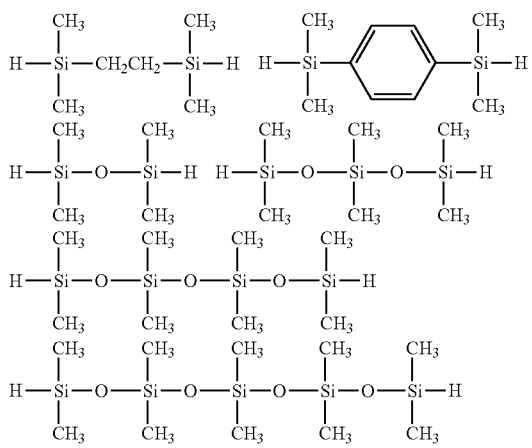

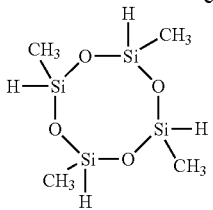

In the reaction of the fluorooxyalkyl-containing polymer having two olefin sites at one end of the molecular chain with the organosilicon compound having at least two SiH groups, but not hydrolyzable terminal groups for preparation of the fluoropolyether-containing polymer-modified silane of formula (1) wherein $\alpha=1$, the organosilicon compound may be used in an amount of 5 to 20 equivalents, preferably 7.5 to 12.5 equivalents, and more preferably about 10 equivalents per equivalent of reactive terminal group of the polymer.

The organosilicon compound having an olefin site and a hydrolyzable terminal group in the molecule used in the preparation of a fluoropolyether-containing polymer-modified silane of formula (1) wherein $\alpha=1$ is preferably selected from compounds having the general formula (12).

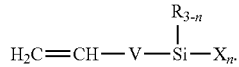  (12)

Herein R, X and n are as defined above. V is a single bond or a divalent hydrocarbon group of 1 to 6 carbon atoms.

In formula (12), V is a single bond or a $C_1$-$C_6$ divalent hydrocarbon group. Examples of the $C_1$-$C_6$ divalent hydrocarbon group include alkylene groups such as methylene, ethylene, propylene (trimethylene or methylethylene), butylene (tetramethylene or methylpropylene) and hexamethylene, and a phenylene group. Preferably V is a single bond or methylene.

In the reaction of the reaction product between the fluorooxyalkyl-containing polymer having two olefin sites at one end of the molecular chain and the organosilicon compound having at least two SiH groups, but not hydrolyzable terminal groups in the molecule with the organosilicon compound having an olefin site and a hydrolyzable terminal group in the molecule for preparation of the fluoropolyether-containing polymer-modified silane of formula (1) wherein $\alpha=1$, the latter organosilicon compound may be used in an amount of 2 to 6 equivalents, preferably 2.2 to 3.5 equivalents, and more preferably about 3 equivalents per equivalent of reactive terminal group of the reaction product of the fluorooxyalkyl-containing polymer and the former organosilicon compound.

Typical of the hydrosilylation catalyst used in the preparation of a fluoropolyether-containing polymer-modified silane of formula (1) wherein $\alpha=1$ are platinum group metal based catalysts including platinum black, chloroplatinic acid, alcohol-modified chloroplatinic acid, complexes of chloroplatinic acid with olefin, aldehyde, vinylsiloxane, and acetylene alcohol, tetrakis(triphenylphosphine)palladium, and chlorotris(triphenylphosphine)rhodium. Inter alia, platinum compounds such as vinylsiloxane coordination compounds are preferred. The hydrosilylation catalyst is preferably used in an amount to provide 0.1 to 100 ppm, more preferably 1 to 50 ppm of transition metal based on the weight of the fluorooxyalkyl-containing polymer having two olefin sites at one end of the molecular chain or the reaction product between the polymer and the organosilicon compound having at least two SiH groups, but not hydrolyzable terminal groups.

Referring back to the process, the solvent and unreacted reactants are distilled off from the aged reaction solution in vacuum, yielding the target compound. For example, when the fluorooxyalkyl-containing polymer having two olefin sites at one end of the molecular chain is of the formula:

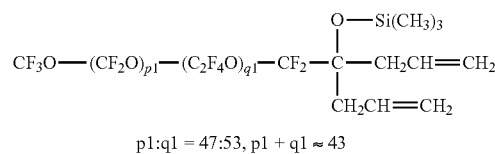

p1:q1 = 47:53, p1 + q1 ≈ 43 and the organosilicon compound having a SiH group and a hydrolyzable terminal group in the molecule is trimethoxysilane, there is obtained a compound of the following formula.

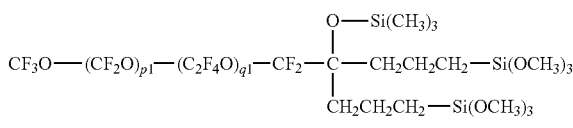

p1:q1 = 47:53, p1 + q1 ≈ 43

Next, the fluoropolyether-containing polymer-modified silane of formula (1) wherein $\alpha=2$ may be prepared, for example, by the following methods. In one exemplary method, a fluorooxyalkylene-containing polymer having two olefin sites at each end of the molecular chain is dissolved in a solvent, typically fluorochemical solvent such as 1,3-bis(trifluoromethyl)benzene. To the solution, an organosilicon compound having a SiH group and a hydrolyzable terminal group in the molecule such as trimethoxysilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 20 to 36 hours, and more preferably about 24 hours.

Instead of the organosilicon compound having a SiH group and a hydrolyzable terminal group in the molecule, an SiH-containing organosilicon compound free of a hydrolyzable terminal group may also be used. In this case, an organosilicon compound having at least two SiH groups, but not hydrolyzable terminal group is used. Once the organosilicon compound having at least two SiH groups, but not hydrolyzable terminal group is reacted with a fluorooxyalkylene-containing polymer having two olefin sites at each end of the molecular chain like the above method, a mixture of the resulting polymer product having terminal SiH groups and an organosilicon compound having an olefin site and a hydrolyzable terminal group in the molecule such as allyltrimethoxysilane is aged, in the presence of a hydrosilylation catalyst such as a toluene solution of chloroplatinic acid/vinylsiloxane complex, at a temperature of 40 to 120° C., preferably 60 to 100° C., and more preferably about 80° C. for 1 to 72 hours, preferably 20 to 36 hours, and more preferably about 24 hours.

The fluorooxyalkylene-containing polymer having two olefin sites at each end of the molecular chain is typically a fluorooxyalkylene-containing polymer of the general formula (13):

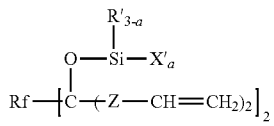

(13)

Herein Rf, Z, R', X' and a are as defined above.

Preferred examples of the fluorooxyalkylene-containing polymer of formula (13) are shown below. In each formula, the repetition number of repeating units in the form of fluorooxyalkylene groups, also referred to as degree of polymerization, may be an arbitrary number meeting formula (3) representative of Rf.

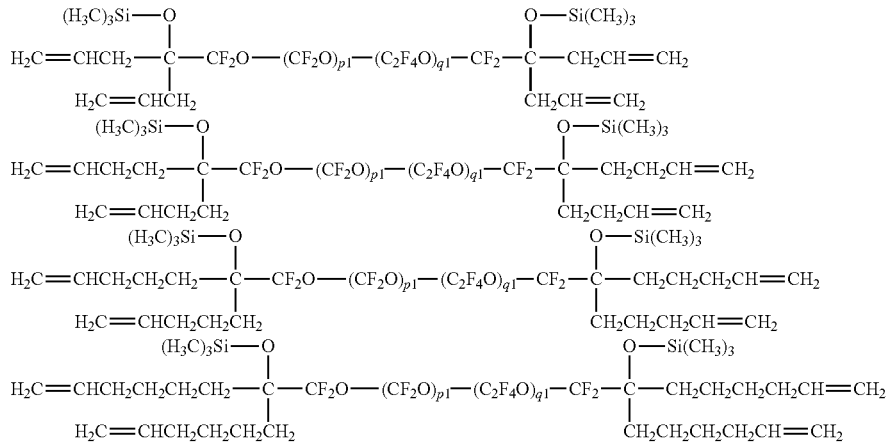

Herein p1, q1 and p1+q1 are as defined above.

The fluorooxyalkylene-containing polymer of formula (13) may be prepared, for example, by the following method. A fluorooxyalkylene-containing polymer having a hydroxyl group at each end of the molecular chain is mixed with a silylating agent and optionally a solvent, and aged in the presence of a base at a temperature of 0 to 80° C., preferably 40 to 60° C., and more preferably about 50° C. for 1 to 24 hours, preferably 2 to 10 hours, and more preferably about 3 hours.

Another method may be employed for preparing the fluorooxyalkylene-containing polymer of formula (13). A fluorooxyalkylene-containing polymer having a hydroxyl group at each end of the molecular chain is mixed with a hydrosilane and a solvent in the presence of a dehydrogenation catalyst at 0 to 60° C., preferably 15 to 35° C., and more preferably about 25° C. for 10 minutes to 24 hours, preferably 30 minutes to 2 hours, and more preferably about 1 hour for dehydrogenation reaction.

Examples of the fluorooxyalkylene-containing polymer having a hydroxyl group at each end of the molecular chain used for preparation of the fluorooxyalkylene-containing polymer of formula (13) are given below.

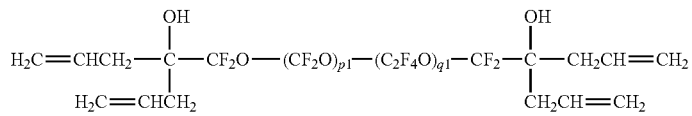

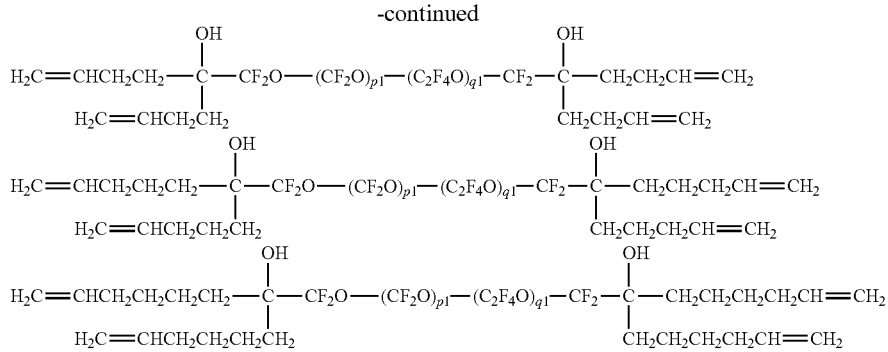

Herein p1, q1, and p1+q1 are as defined above.

The fluorooxyalkylene-containing polymer having a hydroxyl group at each end of the molecular chain may be prepared, for example, by the following method. A perfluorooxyalkylene-containing polymer having an acid fluoride group (—C(=O)—F) at each end of the molecular chain is mixed with a Grignard reagent as a nucleophilic reagent and a solvent such as 1,3-bis(trifluoromethyl)benzene or tetrahydrofuran, and aged at a temperature of 0 to 80° C., preferably 50 to 70° C., and more preferably about 60° C. for 1 to 6 hours, preferably 3 to 5 hours, and more preferably about 4 hours.

Besides the acid fluoride, the perfluorooxyalkylene-containing polymer may have another group at each end of the molecular chain, such as acid halide, acid anhydride, ester, carboxylic acid or amide. Examples of the perfluorooxyalkylene-containing polymer having such a group at each end of the molecular chain are shown below.

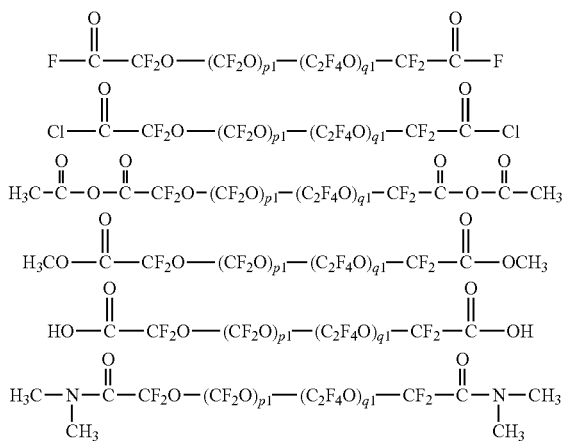

Herein p1, q1, and p1+q1 are as defined above

The nucleophilic reagent used in the preparation of a fluorooxyalkylene-containing polymer having a hydroxyl group at each end of the molecular chain may be selected from allylmagnesium halides, 3-butenylmagnesium halides, 4-pentenylmagnesium halides, and 5-hexenylmagnesium halides, for example. Corresponding lithium reagents may also be used. The nucleophilic reagent may be used in an amount of 4 to 10 equivalents, preferably 5 to 7 equivalents, and more preferably about 6 equivalents per equivalent of reactive terminal group of the perfluorooxyalkylene-containing polymer.

As the solvent used in the preparation of a fluorooxyalkylene-containing polymer having a hydroxyl group at each end of the molecular chain, suitable fluorochemical solvents include 1,3-bis(trifluoromethyl)benzene, trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoro-methyl)pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane.

The solvent may be used in an amount of 10 to 300 parts, preferably 100 to 200 parts, and more preferably about 150 parts by weight per 100 parts by weight of the perfluorooxyalkylene-containing polymer.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkylene-containing polymer having a hydroxyl group at each end of the molecular chain.

Typical of the silylating agent used in the preparation of a fluorooxyalkylene-containing polymer of formula (13) are silyl halides and silyl triflates including trimethylsilyl chloride, triethylsilyl chloride, t-butyldimethylsilyl chloride, triisopropylsilyl chloride, triphenylsilyl chloride, trimethylsilyl bromide, trimethylsilyl triflate, triethylsilyl triflate, t-butyldimethylsilyl triflate, and triisopropylsilyl triflate. Where the base is not used, hexamethyldisilazane, trimethylsilyldimethylamine, trimethylsilyldiethylamine or trimethylsilylimidazole may be used. The silylating agent may be used in an amount of 1 to 10 equivalents, preferably 1 to 4 equivalents, and more preferably about 2 equivalents per equivalent of reactive terminal group of the fluorooxyalkylene-containing polymer having a hydroxyl group.

Examples of the base used in the preparation of a fluorooxyalkylene-containing polymer of formula (13) are amines and alkali metal bases. Suitable amines include triethylamine, diisopropylethylamine, pyridine, DBU, and imidazole. Suitable alkali metal bases include sodium hydroxide, potassium hydroxide, sodium hydride, potassium hydride, alkyllithium, potassium t-butoxide, lithium diisopropylamide, lithium bis(trimethylsilyl)amide, sodium bis(trimethylsilyl)amide, and potassium bis(trimethylsilyl)amide. The base may be used in an amount of 1 to 10 equivalents, preferably 1 to 4 equivalents, and more preferably about 2 equivalents per equivalent of reactive terminal group of the fluorooxyalkylene-containing polymer having a hydroxyl group.

As the solvent used in the preparation of a fluorooxyalkylene-containing polymer(13), suitable fluorochemical solvents include fluorinated aromatic hydrocarbon solvents such as 1,3-bis(trifluoromethyl)benzene and trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 50 to 150 parts, and more preferably about 100 parts by weight per 100 parts by weight of the fluorooxyalkylene-containing polymer having a hydroxyl group.

The hydrosilane used in the preparation of a fluorooxyalkylene-containing polymer of formula (13) may be selected from trimethylsilane, triethylsilane, t-butyldimethylsilane, triisopropylsilane, and triphenylsilane. The hydrosilane is preferably used in an amount of 1 to 5 equivalents, more preferably 1.5 to 3 equivalents, and even more preferably about 2 equivalents per equivalent of reactive terminal group of the fluorooxyalkylene-containing polymer having a hydroxyl group.

Examples of the dehydrogenation catalyst used in the preparation of a fluorooxyalkylene-containing polymer of formula (13) are platinum group metal based catalysts such as rhodium, palladium and ruthenium catalysts, and boron catalysts. Suitable platinum group metal based catalysts include tetrakis(triphenylphosphine)palladium and chlorotris(triphenylphosphine)rhodium, and suitable boron catalysts include tris(pentafluorophenyl)borane. The dehydrogenation catalyst is preferably used in an amount of 0.01 to 0.0005 equivalent, more preferably 0.007 to 0.001 equivalent, and even more preferably about 0.005 equivalent per equivalent of reactive terminal group of the fluorooxyalkylene-containing polymer having a hydroxyl group.

Subsequently, the reaction is stopped. The reaction solution is separated into a water layer and a fluorochemical solvent layer by separatory operation. The fluorochemical solvent layer is washed with an organic solvent before the solvent is distilled off, yielding a fluorooxyalkylene-containing polymer of formula (13).

As mentioned previously, the method for the preparation of a fluoropolyether-containing polymer-modified silane having formula (1) wherein α=2 uses a solvent. As the solvent, fluorochemical solvents are preferred and include 1,3-bis(trifluoromethyl)benzene and trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). The solvent may be used in an amount of 10 to 300 parts, preferably 50 to 150 parts, and more preferably about 100 parts by weight per 100 parts by weight of the fluorooxyalkylene-containing polymer having two olefin sites at each end of the molecular chain.

The organosilicon compound having a SiH group and a hydrolyzable terminal group in the molecule used in the preparation of a fluoropolyether-containing polymer-modified silane of formula (1) wherein α=2 is preferably selected from compounds having the general formulae (5) to (8).

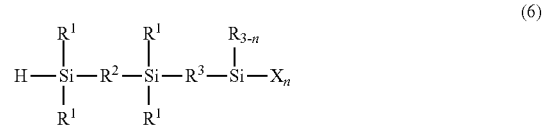

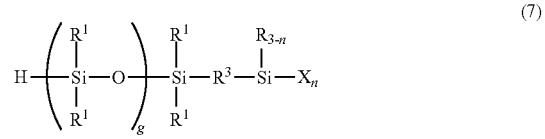

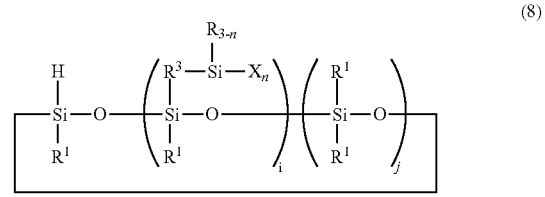

Herein R, X, n, $R^1$, $R^2$, $R^3$, g, i and j are as defined above.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane as well as organosilicon compounds of the following formulae.

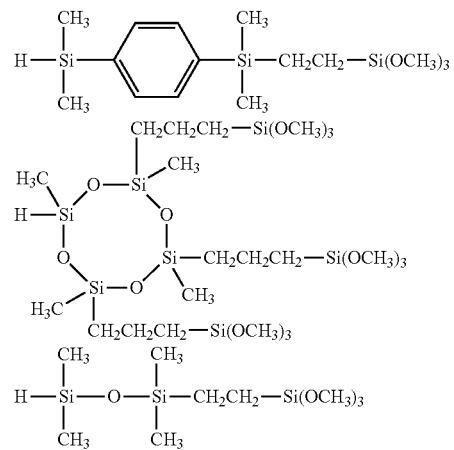

In the reaction of the fluorooxyalkylene-containing polymer having two olefin sites at each end of the molecular chain with the organosilicon compound having a SiH group and a hydrolyzable terminal group in the molecule for preparation of the fluoropolyether-containing polymer-modified silane of formula (1) wherein α=2, the organosilicon compound may be used in an amount of 2 to 6 equivalents, preferably 2.2 to 3.5 equivalents, and more preferably about 3 equivalents per equivalent of reactive terminal group of the polymer.

The organosilicon compound having at least two SiH groups, but not hydrolyzable terminal groups in the molecule used in the preparation of a fluoropolyether-containing polymer-modified silane of formula (1) wherein α=2 is preferably selected from compounds having the general formulae (9) to (11).

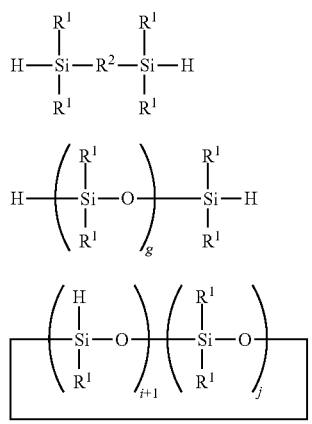

Herein $R^1$, $R^2$, g, j and i are as defined above.

Examples of the organosilicon compound having at least two SiH groups, but not hydrolyzable terminal groups in the molecule are shown below.

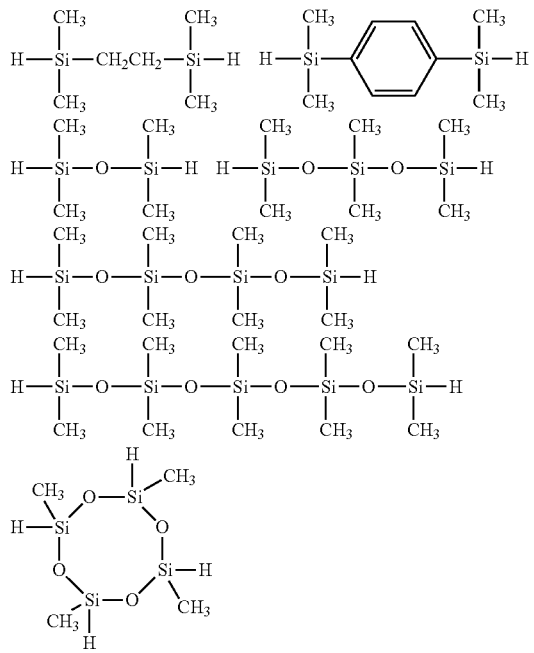

In the reaction of the fluorooxyalkylene-containing polymer having two olefin sites at each end of the molecular chain with the organosilicon compound having at least two SiH groups, but not hydrolyzable terminal groups for preparation of the fluoropolyether-containing polymer-modified silane of formula (1) wherein α=2, the organosilicon compound may be used in an amount of 5 to 20 equivalents, preferably 7.5 to 12.5 equivalents, and more preferably about 10 equivalents per equivalent of reactive terminal group of the polymer.

The organosilicon compound having an olefin site and a hydrolyzable terminal group in the molecule used in the preparation of a fluoropolyether-containing polymer-modified silane of formula (1) wherein α=2 is preferably selected from compounds having the general formula (12).

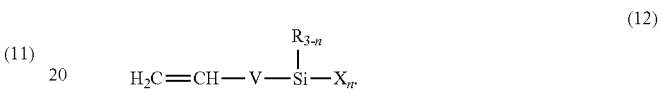

Herein R, X, V and n are as defined above.

In the reaction of the reaction product between the fluorooxyalkylene-containing polymer having two olefin sites at each end of the molecular chain and the organosilicon compound having at least two SiH groups, but not hydrolyzable terminal groups in the molecule with the organosilicon compound having an olefin site and a hydrolyzable terminal group in the molecule for preparation of the fluoropolyether-containing polymer-modified silane of formula (1) wherein α=2, the latter organosilicon compound may be used in an amount of 2 to 6 equivalents, preferably 2.2 to 3.5 equivalents, and more preferably about 3 equivalents per equivalent of reactive terminal group of the reaction product of the fluorooxyalkylene-containing polymer and the former organosilicon compound.

Typical of the hydrosilylation catalyst used in the preparation of a fluoropolyether-containing polymer-modified silane of formula (1) wherein α=2 are platinum group metal based catalysts including platinum black, chloroplatinic acid, alcohol-modified chloroplatinic acid, complexes of chloroplatinic acid with olefin, aldehyde, vinylsiloxane, and acetylene alcohol, tetrakis(triphenylphosphine)palladium, and chlorotris(triphenylphosphine)rhodium. Inter alia, platinum compounds such as vinylsiloxane coordination compounds are preferred. The hydrosilylation catalyst is preferably used in an amount to provide 0.1 to 100 ppm, more preferably 1 to 50 ppm of transition metal based on the weight of the fluorooxyalkylene-containing polymer having two olefin sites at each end of the molecular chain or the reaction product between the polymer and the organosilicon compound having at least two SiH groups, but not hydrolyzable terminal groups.

Referring back to the process, the solvent and unreacted reactants are distilled off from the aged reaction solution in vacuum, yielding the target compound. For example, when the fluorooxyalkylene-containing polymer having two olefin sites at each end of the molecular chain is of the formula:

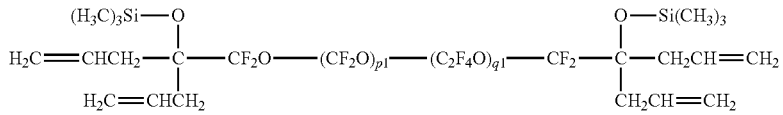

p1:q1 = 47:53, p1 + q1 ≈ 43 and the organosilicon compound having a SiH group and a hydrolyzable terminal group in the molecule is trimethoxysilane, there is obtained a compound of the following formula.

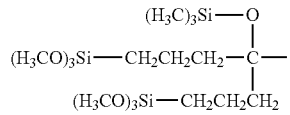 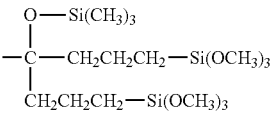

p1:q1 = 47:53, p1 + q1 ≈ 43

Another embodiment of the invention is a surface treating agent comprising the fluoropolyether-containing polymer-modified silane defined above. The surface treating agent may also comprise a partial hydrolyzed form obtained by previously subjecting the fluoropolyether-containing polymer-modified silane to partial hydrolysis in a well-known manner and partially converting the hydrolyzable terminal groups (i.e., X and X' in formula (1)) to hydroxyl groups.

To the surface treating agent, a hydrolytic condensation catalyst may be added if desired. Suitable hydrolytic condensation catalysts include organotin compounds such as dibutyltin dimethoxide and dibutyltin dilaurate, organotitanium compounds such as tetra-n-butyl titanate, organic acids such as acetic acid, methanesulfonic acid, and fluorine-modified carboxylic acids, and inorganic acids such as hydrochloric acid and sulfuric acid. Of these, acetic acid, tetra-n-butyl titanate, dibutyltin dilaurate, and fluorine-modified carboxylic acids are preferred. The catalyst may be added in a catalytic amount, typically 0.01 to 5 parts, more preferably 0.1 to 1 part by weight per 100 parts by weight of the fluoropolyether-containing polymer-modified silane.

The surface treating agent may further comprise a solvent. Suitable solvents include fluorine-modified aliphatic hydrocarbon solvents such as perfluoroheptane and perfluorooctane; fluorine-modified aromatic hydrocarbon solvents such as 1,3-bis(trifluoromethyl)benzene; fluorine-modified ether solvents such as methyl perfluorobutyl ether, ethyl perfluorobutyl ether, and perfluoro(2-butyltetrahydrofuran); fluorine-modified alkylamine solvents such as perfluorotributylamine and perfluorotripentylamine; hydrocarbon solvents such as petroleum benzine, toluene, and xylene; ketone solvents such as acetone, methyl ethyl ketone, and methyl isobutyl ketone. Of these, fluorine-modified solvents are desirable for solubility and wettability, with 1,3-bis(trifluoromethyl)benzene, perfluoro(2-butyltetrahydrofuran), perfluorotributylamine, and ethyl perfluorobutyl ether being more desirable.

The solvents may be used alone or in admixture of two or more while it is preferred that the fluoropolyether-containing polymer-modified silane be uniformly dissolved in the solvent. An optimum concentration of the fluoropolyether-containing polymer-modified silane in the solvent varies with a particular treating mode. The amount which is easy to weigh may be chosen. When the agent is applied directly, the concentration may preferably be 0.01 to 10% by weight, more preferably 0.05 to 5% by weight based on the total weight of the solvent and the fluoropolyether-containing polymer-modified silane. When the agent is applied by evaporation, the concentration may preferably be 1 to 100% by weight, more preferably 3 to 30% by weight based on the total weight of the solvent and the fluoropolyether-containing polymer-modified silane.

The surface treating agent may be applied to a substrate by any well-known techniques such as brush coating, dipping, spraying and evaporation. In the case of evaporation, the heating mode may be either resistance heating or EB heating. A coating of the surface treating agent is cured to the substrate. The curing temperature varies with a particular coating or curing technique. When the coating technique is evaporation, for example, suitable curing temperature is from 20° C. to 200° C. Humid curing conditions are also useful. The cured coating typically has a thickness of 0.1 to 100 nm, desirably 1 to 20 nm although the thickness depends on the type of substrate.

The substrate to be treated with the surface treating agent is not particularly limited, and may be made of any desired materials including paper, fabric, metals, metal oxides, glass, plastics, ceramics, and quartz. The surface treating agent is effective for endowing the substrate with water/oil repellency. In particular, the surface treating agent is advantageously used for the treatment of $SiO_2$-deposited glass and film.

Various articles may be treated with the surface treating agent. Preferred articles include car navigation systems, mobile phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, antireflective film, and other optical articles. The surface treating agent of the invention is effective for preventing fingerprints and sebum from adhering to the articles and also for imparting scratch resistance. Therefore, it is particularly useful as a water/oil repellent layer on touch panel displays and antireflective films.

The surface treating agent is used for anti-staining coatings on sanitary ware such as bathtubs and washbowls; anti-staining coatings on glazing or strengthened glass and head lamp covers in transport vehicles such as automobiles, trains and aircraft; water/oil repellent coatings on building exteriors; coatings for preventing oil contamination on kitchen ware; anti-staining, anti-sticking, anti-graffiti coatings in telephone booths; anti-fingerprint coatings on artistic objects; anti-fingerprint coatings on compact discs and DVD's; mold parting agents; paint additives; and resin modifiers. The agent is also effective for modifying the flow and dispersion of inorganic fillers, and for improving the lubricity of tape and film.

Example

Examples of the invention are given below by way of illustration and not by way of limitation.

Example 1

A reactor was charged with 100 g of 1,3-bis(trifluoromethyl)benzene, 8.2 g ($5.4 \times 10^{-2}$ mol) of DBU and 100 g ($2.7 \times 10^{-2}$ mol) of a compound of the following formula (A), to which 5.8 g ($5.4 \times 10^{-2}$ mol) of trimethylchlorosilane was added dropwise.

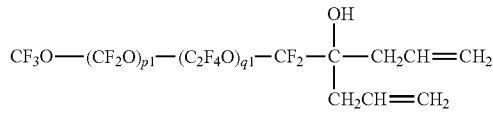

(A)

p1:q1 = 47:53, p1 + q1 ≈ 43

The resulting solution was heated at 50° C. for 3 hours. Thereafter, it was cooled to room temperature and hydrochloric acid aqueous solution was added dropwise. The lower layer or fluoro compound layer was recovered by separatory operation and washed with methanol. The lower layer or fluoro compound layer after washing was recovered again. The residual solvent was distilled off in vacuum, yielding 90 g of a fluoropolyether-containing polymer of the following formula (B).

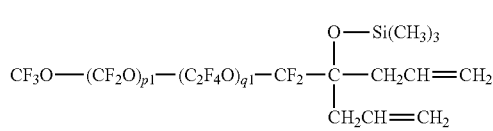

(B)

p1:q1 = 47:53, p1 + q1 ≈ 43

$^1$H-NMR
δ 0-0.2 (—OSi(C$\underline{H}_3$)$_3$) 9H
δ 2.4-2.6 (—C$\underline{H}_2$CH=CH$_2$) 4H
δ 5.0-5.2 (—CH$_2$CH=C$\underline{H}_2$) 4H
δ 5.7-5.9 (—CH$_2$C$\underline{H}$=CH$_2$) 2H A reactor was charged with 90 g ($2.4 \times 10^{-2}$ mol) of the compound having the formula (B) shown below, 90 g of 1,3-bis(trifluoromethyl)benzene, 9.0 g ($7.4 \times 10^{-2}$ mol) of trimethoxysilane, and $9.0 \times 10^{-2}$ g of a toluene solution of chloroplatinic acid/vinylsiloxane complex (containing $2.4 \times 10^{-6}$ mol of Pt), which were mixed.

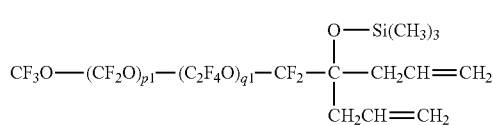

(B)

p1:q1 = 47:53, p1 + q1 ≈ 43

The solution was aged at 80° C. for 24 hours. Thereafter, the solvent and unreacted reactants were distilled off in vacuum, obtaining 93 g of a liquid product.

On NMR analysis, the product was identified to have a structure of the following formula (C).

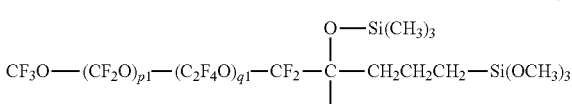

(C)

p1:q1 = 47:53, p1 + q1 ≈ 43

$^1$H-NMR
δ 0-0.2 (—OSi(C$\underline{H}_3$)$_3$) 9H
δ 0.4-0.6 (—CH$_2$CH$_2$C$\underline{H}_2$—Si) 4H
δ 1.3-1.6 (—CH$_2$C$\underline{H}_2$CH$_2$—Si) 4H
δ 1.6-1.9 (—C$\underline{H}_2$CH$_2$CH$_2$—Si) 4H
δ 3.3-3.6 (—Si(OC$\underline{H}_3$)$_3$) 18H Example 2

A reactor was charged with 200 g of 1,3-bis(trifluoromethyl)benzene, 0.29 g ($5.5 \times 10^{-4}$ mol) of tris(pentafluorophenyl)borane and 400 g ($1.1 \times 10^{-1}$ mol) of a compound of the following formula (A), to which 14.1 g ($1.2 \times 10^{-1}$ mol) of triethylsilane was slowly added dropwise.

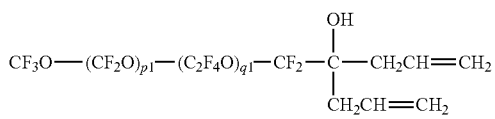

(A)

p1:q1 = 47:53, p1 + q1 ≈ 43

The resulting solution was stirred at 25° C. for 1 hour. Water was added to the solution. The lower layer or fluoro compound layer was recovered by separatory operation and washed with acetone. The lower layer or fluoro compound layer after washing was recovered again. The residual solvent was distilled off in vacuum, yielding 406 g of a fluoropolyether-containing polymer of the following formula (D).

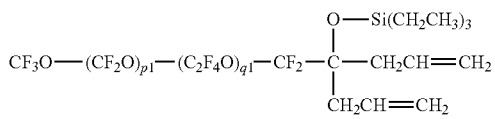

(D)

p1:q1 = 47:53, p1 + q1 ≈ 43

$^1$H-NMR
δ 0.5-0.8 (—SiC$\underline{H}_2$CH$_3$) 2H
δ 0.8-1.1 (—SiCH$_2$C$\underline{H}_3$) 3H
δ 2.4-2.6 (—C$\underline{H}_2$CH=CH$_2$) 4H
δ 5.0-5.1 (—CH$_2$CH=C$\underline{H}_2$) 4H
δ 5.7-5.9 (—CH$_2$C$\underline{H}$=CH$_2$) 2H In a reactor, 220 g ($6.1 \times 10^{-2}$ mol) of the compound having the formula (D) shown below, 220 g of 1,3-bis(trifluoromethyl)benzene, 22 g ($1.8 \times 10^{-1}$ mol) of trimethoxysilane, and $2.2 \times 10^{-1}$ g of a toluene solution of chloroplatinic acid/vinylsiloxane complex (containing $5.9 \times 10^{-6}$ mol of Pt) were mixed.

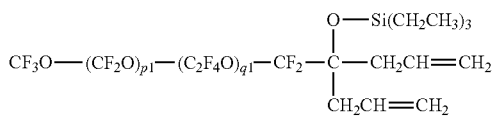

(D)

p1:q1 = 47:53, p1 + q1 ≈ 43

The solution was aged at 80° C. for 24 hours. Thereafter, the solvent and unreacted reactants were distilled off in vacuum, obtaining 226 g of a liquid product.

On NMR analysis, the product was identified to have a structure of the following formula (E).

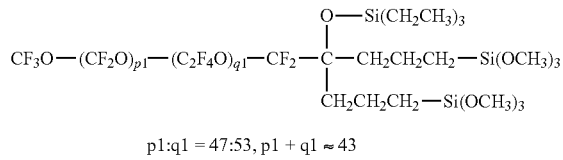

p1:q1 = 47:53, p1 + q1 ≈ 43

$^1$H-NMR
δ 0.4-0.8 (—SiCH$_2$CH$_3$, —CH$_2$CH$_2$CH$_2$—Si) 6H
δ 0.8-1.1 (—SiCH$_2$CH$_3$) 3H
δ 1.4-1.9 (—CH$_2$CH$_2$CH$_2$—Si, —CH$_2$CH$_2$CH$_2$—Si) 8H
δ 3.3-3.7 (—Si(OCH$_3$)$_3$) 18H

Example 3

A reactor was charged with 7.9 g (5.2×10$^{-2}$ mol) of DBU and 100 g (2.6×10$^{-2}$ mol) of a compound of the following formula (F), to which 5.7 g (5.2×10$^{-2}$ mol) of trimethylchlorosilane was added dropwise.

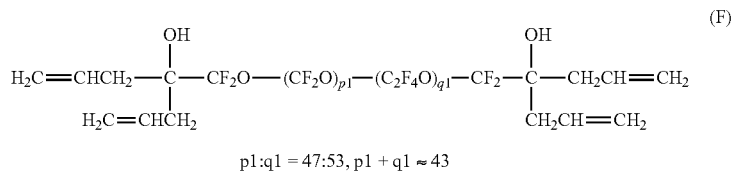

p1:q1 = 47:53, p1 + q1 ≈ 43

The resulting solution was heated at 50° C. for 3 hours. Thereafter, it was cooled to room temperature and hydrochloric acid aqueous solution was added dropwise. The lower layer or fluoro compound layer was recovered by separatory operation and washed with methanol. The lower layer or fluoro compound layer after washing was recovered again. The residual solvent was distilled off in vacuum, yielding 95 g of a fluoropolyether-containing polymer of the following formula (G).

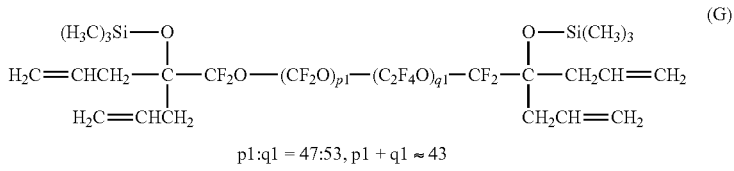

p1:q1 = 47:53, p1 + q1 ≈ 43

$^1$H-NMR
δ 0-0.2 (—OSi(CH$_3$)$_3$) 18H
δ 2.4-2.6 (—CH$_2$CH=CH$_2$) 8H
δ 5.0-5.2 (—CH$_2$CH=CH$_2$) 8H
δ 5.7-5.9 (—CH$_2$CH=CH$_2$) 4H

In a reactor, 90 g (2.3×10$^{-2}$ mol) of the compound having the formula (G) shown below, 90 g of 1,3-bis(trifluoromethyl)benzene, 8.4 g (6.9×10$^{-2}$ mol) of trimethoxysilane, and 8.4×10$^{-2}$ g of a toluene solution of chloroplatinic acid/vinylsiloxane complex (containing 2.3×10$^{-6}$ mol of Pt) were mixed.

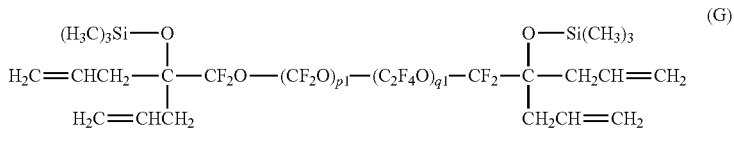

p1:q1 = 47:53, p1 + q1 ≈ 43

The solution was aged at 80° C. for 24 hours. Thereafter, the solvent and unreacted reactants were distilled off in vacuum, obtaining 92 g of a liquid product.
On NMR analysis, the product was identified to have a structure of the following formula (H).

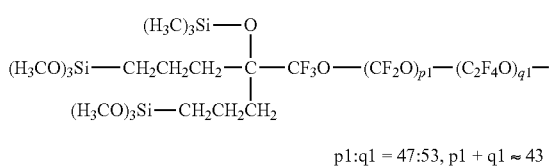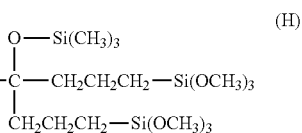

(H)

p1:q1 = 47:53, p1 + q1 ≈ 43

¹H-NMR
δ 0-0.2 (—OSi(C<u>H</u>₃)₃) 18H
δ 0.4-0.6 (—CH₂CH₂C<u>H</u>₂—Si) 8H
δ 1.3-1.6 (—CH₂C<u>H</u>₂CH₂CH—Si) 8H
δ 1.6-1.9 (—C<u>H</u>₂CH₂CH₂—Si) 8H
δ 3.3-3.6 (—Si(OC<u>H</u>₃)₃) 36H

The following polymers were used for comparison.

Comparative Example 1

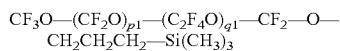

$p1{:}q1{=}47{:}53$, $p1{+}q1{\approx}43$

Comparative Example 2

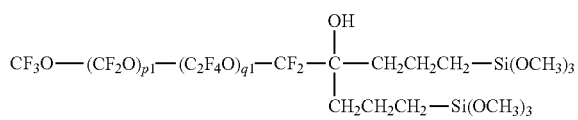

p1:q1 = 47:53, p1 + q1 ≈ 43

[Preparation of Surface Treating Agent and Formation of Cured Film]

Surface treating agents were prepared by dissolving the fluoropolyether-containing polymer-modified silanes obtained in Examples 1 to 3 and the polymers of Comparative Examples 1 and 2 in solvent Novec® 7200 (ethyl perfluorobutyl ether by 3M) in a concentration of 20 wt %. Onto glass having an outermost surface treated with SiO₂ of 10 nm (Gorilla® by Corning), 7 mg of each surface treating agent was deposited by vacuum evaporation at a pressure of $2.0{\times}10^{-2}$ Pa and a temperature of 700° C. The deposit was held at 25° C. in an atmosphere of humidity 40% for 24 hours, obtaining a cured film of 10 nm thick.

[Evaluation]
Initial Water Repellency

Using a contact angle meter Drop Master (Kyowa Interface Science Co., Ltd.), the cured film on glass was measured for a contact angle with water as an index of water repellency. The results are shown in Table 1. All the films showed excellent water repellency at the initial.

Weatherability

The cured film on glass was exposed to UV light (wavelength 300-400 nm) from a metal halide lamp at an irradiance of 770 W/m² for 160 hours. After this weathering, the film was measured for a contact angle with water again. The results are shown in Table 1.

As seen from the results in Table 1, the film of Comparative Example 1 using a polymer having an ether bond-containing linker showed a substantial drop of contact angle, indicating poor weathering resistance. As compared with the film of Comparative Example 2 using a polymer containing a carbon-bonded hydroxyl group, but not ether bond in a linker, the films of Examples 1 to 3 using a polymer-modified silane showed improved weatherability.

Storage Stability Test

The fluoropolyether-containing polymer-modified silanes obtained in Examples 1 to 3 and the polymer of Comparative Example 2 each were dissolved in Novec® 7200 (ethyl perfluorobutyl ether by 3M) (water content of 50 ppm) in a concentration of 0.1 wt %. The dilute solution was stored at 50° C. for 1 month, after which the solution was examined by gel permeation chromatography (GPC) whether or not a condensate formed. The measurement was performed under the following conditions. The results are shown in Table 2.

| Measurement conditions | |
|---|---|
| Developing solvent: | hydrochlorofluorocarbon (HCFC-225) |
| Flow rate: | 1 mL/min |
| Detector: | Evaporative light scattering detector |
| Column: | TSKgel Multipore HXL-M (Tosoh Corp.) 7.8 mm ID × 30 cm, 2 columns |
| Column Temperature: | 35° C. |
| Sample amount injected: | 100 μL (solution of concentration 0.1 wt %) |

As seen from the results in Table 2, the polymer having a carbon-bonded hydroxyl group of Comparative Example 2 formed a condensate whereas the fluoropolyether-containing polymer-modified silanes of Examples 1 to 3 in which the carbon-bonded hydroxyl group had been capped formed almost no condensate.

TABLE 1

Film cured at 25° C. and humidity 40% for 24 hours

| Agent | Initial contact angle (°) | Contact angle after weathering (°) |
|---|---|---|
| Example 1 | 117 | 107 |
| Example 2 | 116 | 108 |
| Example 3 | 111 | 108 |
| Comparative Example 1 | 116 | 48 |
| Comparative Example 2 | 117 | 102 |

TABLE 2

Condensate content (%) in the dilute solution after storage at 50° C. for 1 month

| Agent | Condensate (%) |
|---|---|
| Example 1 | 0 |
| Example 2 | 0 |
| Example 3 | 0 |
| Comparative Example 2 | 4 |

Japanese Patent Application No. 2015-093830 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An article which is surface treated with a surface treating agent, comprising a fluoropolyether-containing polymer-modified silane having formula (1):

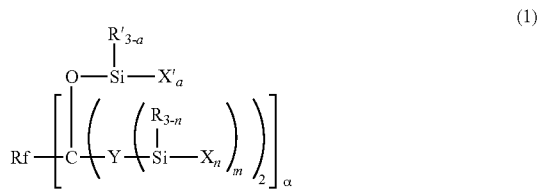

wherein Rf is a monovalent fluorooxyalkyl or divalent fluorooxyalkylene-containing polymer residue, Y is a divalent to hexavalent hydrocarbon group which may contain a siloxane bond or a silylene group, R and R' are each independently a $C_1$-$C_4$ alkyl group or phenyl group, X and X' are each independently a hydroxyl or hydrolyzable group, n is an integer of 1 to 3, a is an integer of 0 to 3, m is an integer of 1 to 5, and α is 1 or 2, the surface treating agent further comprising a fluorine-modified solvent, and the fluoropolyether-containing polymer-modified silane represented by formula (1) being contained at a concentration of 0.01 to 30% by weight based on the total weight of the fluorine-modified solvent and the fluoropolyether-containing polymer-modified silane.

2. The article of claim 1, wherein α in formula (1) is 1, and Rf is a group having the general formula (2):

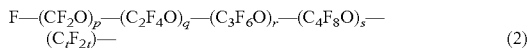

wherein p, q, r and s are each independently an integer of 0 to 200, the sum p+q+r+s is 3 to 200, t is an integer of 1 to 3, each repeating unit may be linear or branched, and individual repeating units may be randomly arranged.

3. The article of claim 1, wherein a in formula (1) is 2, and Rf is a group having the general formula (3):

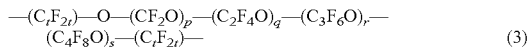

wherein p, q, r and s are each independently an integer of 0 to 200, the sum p+q+r+s is 3 to 200, t is an integer of 1 to 3, each repeating unit may be linear or branched, and individual repeating units may be randomly arranged.

4. The article of claim 1, wherein Y in formula (1) is selected from the group consisting of a $C_3$-$C_{10}$ alkylene group, a $C_8$-$C_{16}$ alkylene group containing phenylene, a divalent group having $C_2$-$C_{10}$ alkylene groups bonded via a silalkylene or silarylene structure, and a divalent to tetravalent group having $C_2$-$C_{10}$ alkylene groups bonded to a divalent to tetravalent, linear organopolysiloxane residue of 2 to 10 silicon atoms or branched or cyclic organopolysiloxane residue of 3 to 10 silicon atoms.

5. The article of claim 1, wherein X and X' each in formula (1) are selected from the group consisting of hydroxyl, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

6. The article of claim 1, wherein the polymer-modified silane having formula (1) is selected from compounds having the following formulae:

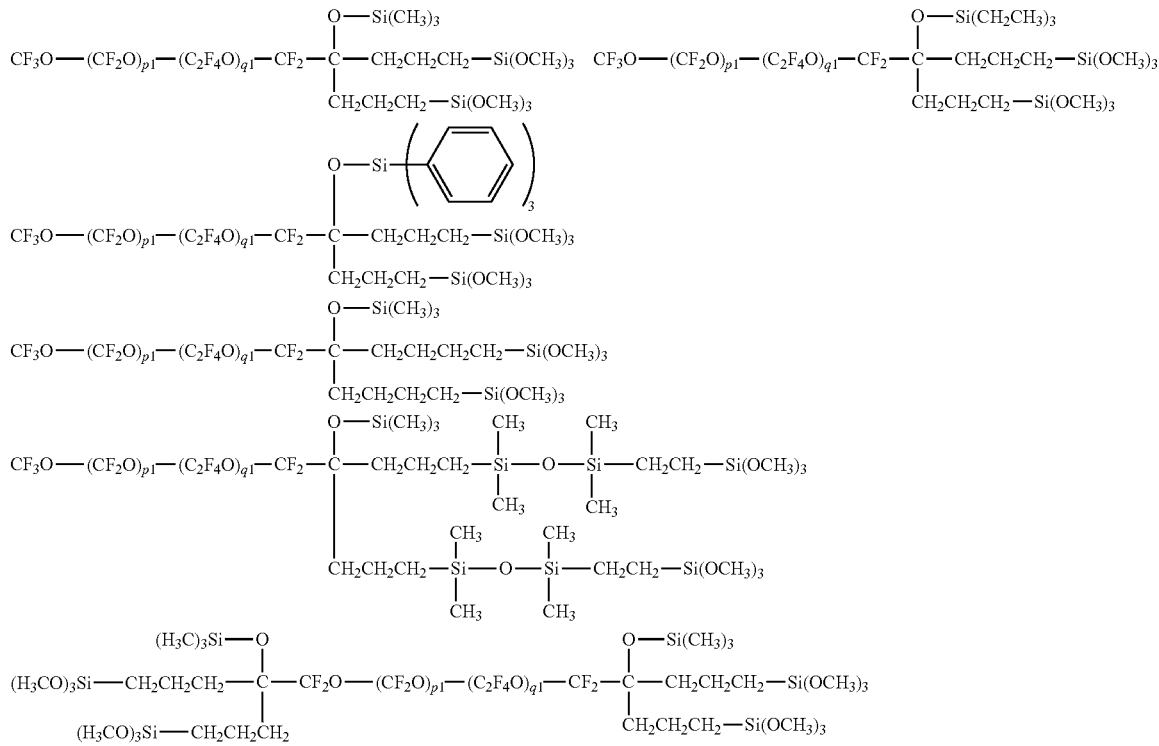

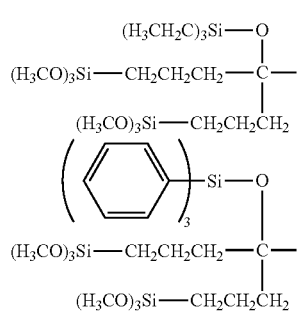 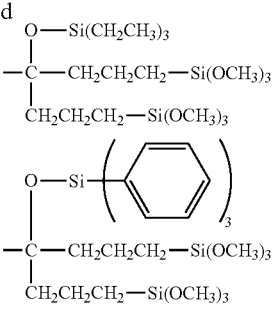
wherein p1 is an integer of 5 to 100, q1 is an integer of 5 to 100, and p1+q1 is an integer of 10 to 105.
* * * * *